(12) United States Patent
LaMountain et al.

(10) Patent No.: US 11,461,974 B2
(45) Date of Patent: Oct. 4, 2022

(54) SYSTEM AND METHOD FOR CREATING GEO-LOCATED AUGMENTED REALITY COMMUNITIES

(71) Applicant: ArKnet, Inc., Oro Valley, AZ (US)

(72) Inventors: David LaMountain, Coventry, RI (US); Jon N. Leonard, Oro Valley, AZ (US); Jordan Gray, Yellow Springs, OH (US)

(73) Assignee: ARKNET INC., Oro Valley, AZ (US)

( * ) Notice: Subject to any disclaimer, the term of this patent is extended or adjusted under 35 U.S.C. 154(b) by 0 days.

(21) Appl. No.: 17/390,110

(22) Filed: Jul. 30, 2021

(65) Prior Publication Data

US 2022/0058875 A1   Feb. 24, 2022

Related U.S. Application Data

(60) Provisional application No. 63/059,609, filed on Jul. 31, 2020.

(51) Int. Cl.
| | | |
|---|---|---|
| *G06T 19/00* | (2011.01) | |
| *H04N 21/8545* | (2011.01) | |
| *H04N 21/81* | (2011.01) | |
| *H04N 21/858* | (2011.01) | |
| *G06V 20/20* | (2022.01) | |

(52) U.S. Cl.
CPC .......... *G06T 19/003* (2013.01); *G06T 19/006* (2013.01); *G06V 20/20* (2022.01); *H04N 21/812* (2013.01); *H04N 21/858* (2013.01); *H04N 21/8545* (2013.01); *G06T 2219/024* (2013.01)

(58) Field of Classification Search
CPC ................. G06T 19/003; G06T 19/006; G06T 2219/024; G06V 20/20; H04N 21/812; H04N 21/8545; H04N 21/858; H04N 21/25841; H04N 21/41407; H04N 21/8146
See application file for complete search history.

(56) References Cited

U.S. PATENT DOCUMENTS

| | | |
|---|---|---|
| 7,751,805 B2 | 7/2010 | Neven et al. |
| 8,180,396 B2 | 5/2012 | Athsani et al. |
| 8,275,397 B2 | 9/2012 | Huston |
| 8,432,414 B2 | 4/2013 | Vetterli et al. |
| 8,542,906 B1 | 9/2013 | Persson et al. |
| 8,929,591 B2 | 1/2015 | Calman et al. |
| 9,286,721 B2 | 3/2016 | Adhikari et al. |
| 9,317,600 B2 | 4/2016 | Harris et al. |
| 9,536,251 B2 | 1/2017 | Huang et al. |

(Continued)

FOREIGN PATENT DOCUMENTS

KR   10-2014-0140442   12/2014

*Primary Examiner* — Jeffery A Brier
(74) *Attorney, Agent, or Firm* — Bacon & Thomas, PLLC

(57) ABSTRACT

An augmented reality method and system enables sponsors within a defined geographic area to insert enhanced augmented reality objects into navigable views of a geographic area to form "communities" searchable by a common name or identifier. Users of the method and system situated outside the geographic area may then explore the community by entering the name or identifier of the community, navigating between images containing geolocated scenes taken from or representing the geographic area or community, and interacting with the augmented reality objects positioned within the images.

14 Claims, 4 Drawing Sheets

(56) References Cited

U.S. PATENT DOCUMENTS

| | | |
|---|---|---|
| 9,773,285 B2 | 9/2017 | Calman et al. |
| 10,943,396 B1 * | 3/2021 | Kelly ....................... G06F 3/005 |
| 10,950,049 B1 * | 3/2021 | Kelly ....................... H04R 5/00 |
| 2006/0284791 A1 | 12/2006 | Chen et al. |
| 2009/0289955 A1 | 11/2009 | Douris et al. |
| 2012/0176411 A1 | 7/2012 | Huston |
| 2015/0062114 A1 | 3/2015 | Ofstad |
| 2017/0243403 A1 | 8/2017 | Daniels et al. |

* cited by examiner

Select visibility and multi-symbol options

Choose visibility option for a specific ArK Symbol
- Invisible (no other ArKr sees this ArK Symbol)
- Open to all (all ArKrs see this ArK Symbol)
- Select visibility (certain ArKrs see this Symbol)   — 39

Select multiple ArK Symbols
- Different ArK Symbols for different groups
- Different ArK Symbols for different occasions   — 40

Fig. 6

Interaction with ArKs

Ark2Ark interactions (mobile ArK to mobile ArK comms)
- Peer to peer(P2P) software
- P2P supplemented with ArKnet server assistance
- SMS, email, web browser communications, FTP services   — 41

Mobile ArK to Fixed Location ArK
- Interact directly with the contents of the deployed fixed ArK
- Browse contents, download/upload files
- Make purchases   — 42

Fig. 7

Environ View and Map View

Toggle to Environment view   — 43

Image the environment
- See near-friend's mobile ArK Symbols in imagery
- Select friend's ArK symbol and engage
- See all visible near-ArKs, by type, and engage if desired   — 44

Toggle to Map View   — 45

Browse Map View
- See all visible near-ArKs, by type, and engage
- Browse contents, download/upload files
- Make purchases   — 46

Fig. 8

SYSTEM AND METHOD FOR CREATING GEO-LOCATED AUGMENTED REALITY COMMUNITIES

This application claims the benefit of U.S. Provisional Appl. Ser. No. 63/059,609, filed Jul. 31, 2020, and incorporated herein by reference.

BACKGROUND OF THE INVENTION

1. Field of the Invention

The current invention relates to a modification of the augmented reality (AR) method and system described in copending U.S. patent application Ser. No. 16/674,559, filed Nov. 5, 2019, and incorporated herein by reference.

More particularly, the invention relates to a method and system of enabling sponsors within a defined geographic area to insert enhanced augmented reality objects of the type described in copending U.S. patent application Ser. No. 16/674,559 (referred to herein as "ArKs") into virtual reality scenes of the geographic area to form "communities" searchable by a common name or identifier. Users of the method and system other than the sponsors, and/or that are situated outside the geographic area, may then explore the community by entering the name or identifier of the community, navigating between images containing geolocated scenes taken from or representing the geographic area or community, and interacting with ArKs positioned within the images. Instead of being limited to interacting with ArKs inserted into live scenes captured by a user's mobile device in the immediate vicinity of the user, the user is free to interact with ArKs inserted into virtual reality images of remote geographic areas, which the viewer is free to explore as if the viewer were present in the remote geographic area, while at the same time enabling sponsors in the remote geographic area to disseminate content to an audience or customers to the wider world beyond the beyond the boundaries of the geographic area.

As described in the copending application, the augmented reality objects are geolocated and serve as portals or links to content sponsored by and associated with real entities visible in the images. By inserting the augmented reality objects into virtual reality images of a location that is remote from the viewer's location, the viewer is in effect "teleported" to the remote location and able to explore and interact with entities at the location as if the viewer were present in person. The virtual reality space surrounding the remote location may be thought of as forming a digital version of the ancient Greek "agora," i.e., a town center or market served as a gathering place for the community, offering a variety of businesses and attractions as well as a forum for interaction between the residents and visitors to the community.

2. Description of Related Art

Conventional brick and mortar shopping is rapidly losing out to online shopping. Shopping malls and town centers are becoming obsolete and shutting down in the face of competition from integrated online sites such as Amazon.com™, or individual sites listed on the first few pages of search results from search engines such as Google™. The result of this "retail apocalypse" is not just the closure of small businesses and loss of jobs, but a loss of community and all that the term "community" implies, including opportunities for residents to gather in common areas to interact with each other, exchange ideas, share values, and help their neighbors. Even with search engines, small businesses can be lost in the digital world, invisible next to the Amazons and Walmarts that currently dominate e-commerce.

Of course, the digital revolution cannot be stopped. People will continue to spend more money online, and less time at brick and mortar stores. However, the loss of community is not inevitable. It is still possible to create communities. It is just that in the $21^{st}$ Century, those "communities" are no longer tied to physical locations. Instead, social media has taken the place of physical communities. Physical neighborhoods no longer have the meaning that they once did. Malls and downtowns are deserted. The present invention seeks to bring back the concept of the physical community, offering the opportunity for residents of the community to collaborate in a manner similar to the way that vendors once gathered in town centers and agoras, allowing small businesses and others to compete with the Amazons of the digital world by being associated with a community and all that the community has to offer. Augmented and virtual reality technologies offer the means to accomplish this.

By "virtual reality" (VR) is meant the ability to display images from the point of view of a person that is present at the location depicted in the images, whether the images are captured live, recorded, or created by graphics software. An example of virtual reality that depicts real locations using recorded images is "Google™ Street View™", which allows a user to view images of remote locations from the point of view of a person at the location, and that further allows the user to virtually explore the location by changing the images as if the person were physically moving with the location.

On the other hand, the term "augmented reality" (AR) generally refers to insertion of digital images into a live scene, for example as captured by a smartphone camera. The digital images may be text blocks that provide information about the entities in the live scene, or hyperlinks to interactive content such as a takeout menu of a restaurant in the scene through which items listed on the menu can be ordered.

Copending U.S. patent application Ser. No. 16/674,559 offers improvements to the AR concept by providing a system and method that enables users to more easily deploy the objects, and that provides for improved presentation, content, and distribution of the objects, the enhanced objects being referred to as ArKs. The improved presentation includes addition of motion and display of the ArKs as three-dimensional objects.

The present invention provides further improvements to the AR concept, by enabling sponsors within a defined geographic area to insert enhanced augmented reality objects or "ArKs" into virtual reality scenes of the geographic area, which is searchable by a common name or identifier. Non-sponsor users of the system and method may then explore the community by entering the name or identifier of the community, navigating between images containing geolocated scenes taken from or representing the geographic area or community, and interacting with ArKs positioned within the images. The combination of the ArKs and geolocated virtual reality environment together form a "community" open to anyone with an Internet connection and corresponding app.

By way of background, U.S. Patent Publication No. 2017/0243403 discloses the insertion of AR objects (referred to as "AR content") into "a VR representation of a real-world location by creating virtual copies of the one or more physical features of the real-world location and incorporating the AR content items in to the VR representation to generate an offsite virtual AR representation," or "ovAR." However, the remote scene in which the AR content is placed is limited to a fixed point of view and does not offer the viewer the ability to dynamically explore an entire "community," i.e., multiple AR objects in a defined area rather than just static "scenes" taken at predetermined remote locations. Furthermore, U.S. Patent Publication No. 2017/0243403 does not disclose that the "AR content" are dynamic objects corresponding to the above-described "ArKs," which are not merely captions or hyperlinks to text documents, but rather are portals to a variety of digital entities. The publication does discuss "interaction" with the AR content, but the "interaction" only involves "editing, changing, or creating AR content" and subsequently sharing the edits, changes, or new content among users of the "ovAR."

U.S. Pat. No. 9,286,721 is directed to another example of the type of system disclosed in U.S. Patent Publication No. 2017/0243403, in which a user can select scenes for remote viewing from a map of an area, and in which the scenes are augmented. Again, however, the scenes being augmented static scene selection are limited to a fixed point of view and does not offer the viewer the ability to dynamically explore an entire "community" or real images and associated AR objects in a defined area. Furthermore, the description of the AR content in this patent is limited to text bubbles, rather than interactive ArK-type objects Other examples of systems that insert "augmented reality objects" into views of remote locations are found in U.S. Patent Publication Nos. 2006/0284791 and 2012/0176411, both of which describe inserting static images or captions into live video feeds, such as images captured at various locations around a NASCAR race track or PGA golf course, to enable spectators to more easily follow the action from a grand stand. In addition, U.S. Pat. No. 9,286,721 discloses superposition of AR markers or objects on live images, with the addition of position or point of view adjustment for the purpose of syncing the markers with the entities in the images to correct for GPS drift or positioning errors, while U.S. Pat. Nos. 9,317,600 and 8,929,591 are directed to inclusion of augmented reality objects in scenes captured by a viewer at a particular location. Similarly, U.S. Pat. No. 8,275,397 discloses a system in which remote views rendered from position information for an event (for example, the position of a race car with respect to the a track) are shared among spectators, the remote views being augmented by information bubbles that locate a particular participant in the event so that viewers can keep track of the participant.

Korean Publication No. KR 10-2014-014-0140442 also discloses an augmented reality system in which interactive AR objects are inserted into a live scene, with the additional feature of enabling changes in apparent position of the view to a different apparent position at which hidden real objects corresponding to visible AR objects can actually be viewed. This involves movement of the viewer within the virtual reality scene, but the system disclosed in the Korean publication does not enable the viewer control the movement and thereby freely explore the area surrounding the location of the initial image.

On the other hand, U.S. Patent Publication No. 2015/0062114 discloses a system that, upon selection of a location on a map, retrieves a stored image and displays it together with a text box overlay window with a textual description of the subject matter and the opportunity to navigate to other information about the image. Selection of an AR object in one image leads to a more detailed view of the corresponding real object, taken from a different perspective, and which includes additional AR objects that not only include information, but also hyperlinks to websites: As illustrated in this publication, clicking on the AR object brings up the more detailed view, which includes an AR object with both information and a hyperlink. However, while this publication discloses a way for a remote viewer to "explore" an area, the remote viewer can only "explore" an area by selecting AR object in a static scene (navigation by AR object selection), without any other way to change the view, location within an area, or perspective. As a result, the system does not provide for "movement" within a defined area, or the display of AR objects having different sponsors within a defined area to form a "community."

Finally, U.S. Patent Publication No. 2009/0289955 discloses a system for augmenting live images with information overlays based on the location of the image-capturing device. The information overlays are associated with the location and orientation of the image-capturing device, and include interactive features such as an image of a McDonald's sign that links to a menu and a website through which items can be ordered. While the interactive features of the overlays are similar to ArKs, the system only applies to live scenes and therefore does not allow the user to explore a remote community.

By way of further background on the use of augmented reality in general, U.S. Pat. Nos. 9,773,285, 9,536,251, and 8,929,591 all disclose augmented reality systems that overlay augmented reality objects, referred to as "indicators," on live images captured by a mobile communications device utilizing mobile app software and geo-location, while the Pokemon Go™ augmented reality game utilizes mobile app software that overlays location-linked virtual reality objects on images captured and displayed by the mobile device, and U.S. Pat. No. 8,929,591, discloses a mobile device that overlays geo-located augmented reality objects on a captured live image, the augmented reality objects, referred to as "indicators," serving as links to a wide variety of content, including information, images, video, and links to restaurant reservation or e-commerce "interactive tabs." In these conventional AR systems, the viewing app does not empower the viewer to do anything other than view and interact with content created by others, and does not allow users of the mobile device app to create their own indicators, much less locate and manage them. U.S. Pat. No. 9,773,285 discloses indicators that are similar to those disclosed in U.S. Pat. No. 8,929,591, except that the indicators are summoned by object recognition rather than geolocation, while U.S. Pat. No. 9,536,251 discloses interactive virtual entities that are superimposed on images based on "markers" made up of real objects in the image, and in particular QR codes. Other object recognition based AR methods and systems are disclosed in U.S. Pat. Nos. 8,180,396; 7,751,805; and 8,542,906. On the other hand, U.S. Pat. Nos. 9,317,600 and 8,432,414 both disclose systems that utilize geolocation to add non-interactive captions to objects in an image based on their location. Additional background is described in copending U.S. patent application Ser. No. 16/674,559.

SUMMARY OF THE INVENTION

It is accordingly a first objective of the invention to provide an augmented reality system and method that enables commercial and nonprofit enterprises in a defined geographic to associate with each other and present their offerings under a common name or identifier to form a virtual community accessible by an expanded online audience.

It is a second objective of the invention to provide an improved method and system of deploying and viewing augmented reality objects.

It is a third objective of the invention to provide an AR system and method that allows online users to explore multiple businesses and attractions located within a defined area as if the user of the system and method were present in the defined area.

It is a fourth objective of the invention to provide an AR system and method that allow entities in a defined area, such as a businesses and attractions, to collaborate and achieve the synergistic effect and experience of a popular shopping mall or downtown area while offering the convenience and expanded audience of an e-commerce website.

It is a fifth objective of the invention to provide an AR system and method that overcomes the disadvantages of conventional AR systems by combining navigable virtual reality renderings of a defined area with multiple AR objects inserted into the virtual reality rendering while providing the viewer with the ability to dynamically explore an entire "community" of images and associated AR objects in the defined area.

It is a sixth objective of the invention to provide an app, browser add-in, and/or website capable of achieving the above listed objectives of the invention.

These and other objectives are achieved, in accordance with preferred embodiments of the invention, by a system and method in which: (i) views of a geographic area are selectable by a common name or identifier, such as a town or neighborhood name, a street address, GPS coordinates, longitude and latitude, or any other label capable of uniquely identifying the geographic area, (ii) the views are navigable by known software techniques utilized by conventional navigation software such as, by way of example and not limitation, Google Street View™ that offer a first person view of a location and the ability to navigate through the views, and (iii) the views are augmented by AR objects. The AR objects are preferably enhanced, dynamic AR objects of the type referred to herein as "ArKs" and described in copending U.S. patent application Ser. No. 16/674,559.

The invention may be thought of as a modification of the "ArK" concept described in copending application Ser. No. 16/674,559, of inserting interactive AR objects into a scene captured in real time by a smartphone. The modification is that the ArKs are displayed in scenes captured at locations that are different from the viewer, allowing the viewer to effectively "teleport" to the different location and virtually explore the location by interacting with ArKs sponsored by a variety of businesses, attractions, and other sites in an area or "community" surrounding the selected location, from the perspective of someone at the location. As a result, there is no need to hop from website to website to website. Instead, the invention effectively provides "local" shopping from anywhere.

By way of example, businesses and organizations in a small town in Alaska can collaborate to form a digital community under the name "Sitka," in which views of the town may be virtually visited by viewers from anywhere in the world. When a person in Omaha wishes to visit Sitka, that person will be presented with street views of Sitka and it's gorgeous background scenery, into which have been inserted ArKs representing businesses such as salmon fisheries, tour guides, arts and craft purveyors, hotels, a local museum, the chamber of commerce, and so forth, offering links to content such as lists of items for sale, bookings and reservations, historical information, and videos or Sitka's surroundings and wildlife. Of course, it will be appreciated that a user situated in Sitka may also wish to use the method and system of the invention to explore his own community.

The ArKs may be positioned in scenes that include the sponsor's business, or elsewhere in the displayed images, and may take a variety of forms, both static and dynamic. In addition to providing hyperlinks to e-commerce sites associated with the town, the ArKs may be linked to chat room and community forums, review sites such as Trip Advisor™, games and puzzles associated with Sitka and sponsored by one or more merchants, and so forth, all of which can be used to increase traffic to the virtual "community" and its sponsors.

As a result, the invention is more than just an e-commerce site, or an AR system. Instead, provides a gathering place similar to the ancient Greek "agora," which served as the center of athletic, artistic, spiritual and political life in the city state. Initially, citizens would gather in the agora for military duty or to hear statements of the ruling king or council, but later, the agora also served as a marketplace where merchants kept stalls or shops to sell their goods amid colonnades, which in turn attracted artisans who built workshops nearby. The present invention offers a $21^{st}$ century digital equivalent of the ancient agora, made up of geo-located local community of small businesses and user-created 3D objects within areas defined by neighborhood, village, town, state, or a customized geofence and filtered results, the 3D objects being interactive storage containers that can be interacted with, shared, and even commented on. The heart of the digital agora are 3D business objects. Each geo located business object not only has information about the business, but also serves as an e-commerce portal for digital shopping. Users can browse and purchase products from these community's businesses all in one place.

The digital agora may be implemented on a smartphone app that allows the user to view, on the user's smartphone or other mobile device, a selected location and ArKs associated with entities in the views, and that allows the user to vary the views as if moving around the location. In addition, the invention provides for software that allows the entities to deploy and manage the ArKs. Although the exemplary implementation is a smartphone app, it will be appreciated that invention may be implemented by software run on a PC or tablet, or directly through a website.

The entities that may deploy the ArKs include, but are not limited to, retail stores, restaurants, food trucks, nonprofits, fairs, carnivals, music venues, sporting events, cruise ships, special events, service companies, temporary pop ups, polling stations, games, farmers markets, farms, yard sales, flea markets, products, services, coupons, sales, information, events, real estate listings, memorials, local delivery, pick-up, or take-out, shipping services, home based businesses, online businesses, notifications, mailboxes, signs, municipalities, emergency locations, shelters, schools, charities, and disaster response.

BRIEF DESCRIPTION OF THE DRAWINGS

FIGS. 3-6 illustrating procedures for ArK creation and deployment using a mobile app in accordance with the principles of the first preferred embodiment of the invention.

FIG. 7 is a schematic diagram of a cryptocurrency arrangement that may be used in the preferred embodiment of FIGS. 1-6.

FIG. 8 is a flowchart illustrating procedures for viewing and interaction with ArKs utilizing a mobile device app such as the mobile device app of the embodiment of FIGS. 1-6.

DETAILED DESCRIPTION OF THE PREFERRED EMBODIMENTS

Figure 1A:
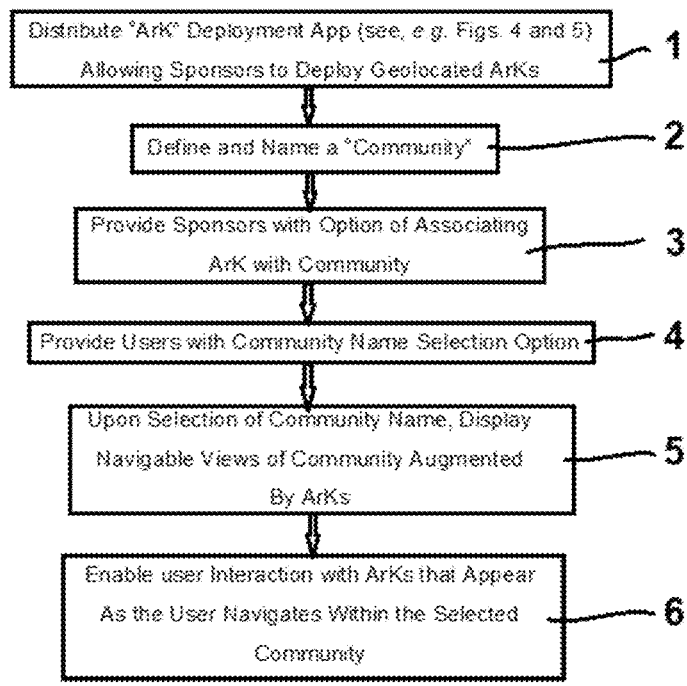
FIG. 1A is a flowchart illustrating the process of deploying ArKs to populate a digital agora or "community" according to the principles of a preferred embodiment of the present invention.

FIG. 1A illustrates a method of creating a "digital agora" or community utilizing views of a defined location and ArKs deployed by vendors and others with interests in the defined location. Although not limited thereto, the method illustrated in FIG. 1A may use the registration and deployment methods illustrated in FIGS. 1-8 of U.S. patent application Ser. No. 16/674,559, modified to enable the ArK's to be associated with a predefined area and accessible through a name or identifier common to the predefined area, the ArKs being displayed in response to selection of the area and a particular view of the area rather than just the instantaneous "live" view captured by a user's mobile device.

In step 1 of the method of FIG. 1A, vendors or other commercial and non-commercial entities, as well as individuals, are provided with an app that allows creation, deployment, viewing, and interaction with geolocated ArKs in images that include the vendors or in the copending U.S. patent application Ser. No. 16/674,559.

In optional step 2, a geographic area or "community" may be defined by setting forth boundaries and/or assigning names to the community. This may for example be necessary if the boundaries of the community are constantly changing, as is the case with "Queens, N.Y. Chinatown" or if the community is known by different alternative names, for example "Main Street" and "Flushing" in the case of Queens Chinatown. If a community is already well defined, then there may be no need for a separate step of defining the community, although it may be still helpful to add additional identifiers, such as GPS coordinates or addresses, by which the community may be searched and addressed.

Once an area is defined or selected as a community, step 3 of the method is to invite or encourage potential sponsors of ArKs to create and deploy ArKs through the distributed app, and thereby join or participate in the "community." The Ark creation and deployment process may be identical to that described in the copending application, aspects of which are illustrated in FIGS. 3-8.

Once the community is established and populated by sponsors with deployed ArKs, users of the app, including users situated outside the community, are then enabled in step 4 to select the community by inputting a name or other appropriate identifier, in step 5 to display navigable images of community on the display screen of a mobile device or computer, and in step 6 to interact with ArKs inserted into the images. Specific algorithms and software for displaying images based on location, and for enabling navigation through the images, are known and form no part of the present invention, while a description of ArK insertion into the images can be found in copending U.S. patent application Ser. No. 16/674,559, and can also use known augmented reality techniques, algorithms, and software.

It will be appreciated that input of the community name or identifier is not limited to typing the name into a text input block, and that the input may instead take the form of selection of a point on a map, selection from a list of names in a menu, use of a search engine, or by any other means for inputting or selecting a community name or identifier. In addition, it should be understood that the term "app" can refer to any computer executable code that enables input by a user, display of images, navigation through the images, and selection of objects in the images, and that the local app may be replaced by html code executed on a web server and displayed through a browser, and that viewing of the images can be enable through use of a partial "viewer only" version of the app that also allows creation and deployment of ArKs.

Figure 1B:
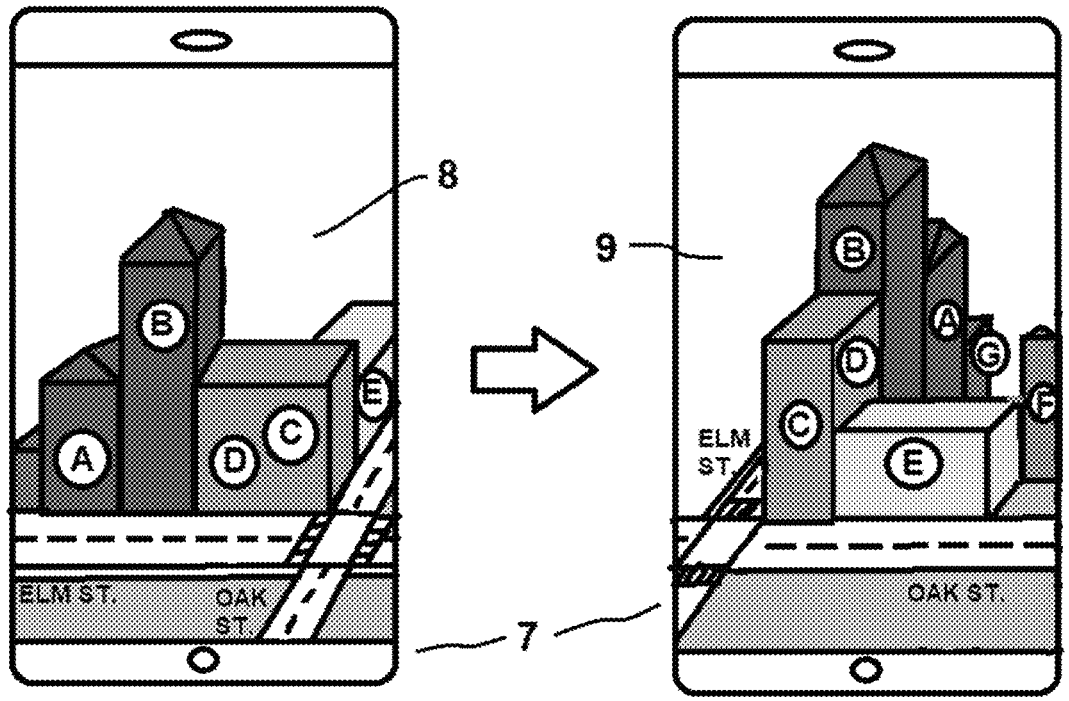
FIG. 1B illustrates a user interface including navigable views of the community and corresponding ArKs deployed according to the method of FIG. 1.

FIG. 1B shows a mobile device 7 on which are displayed images 8 and 9 showing navigable scenes augmented by ArKs A to F according to an illustrative embodiment of the invention. Image 8 shows a group of buildings taken from a first position and angle, while image 9 shows the same group of buildings taken from a second image and angle. Each image is augmented by ArKs, but the placement of the ArKs differs between views depending on which individual buildings or portions of buildings are visible. Although the ArKs are only represented schematically in FIG. 2 by circles, the ArKs can have any shape and may also include or take the form of photographic images. The images 8 and 9 on which the ArKs are superimposed may be photographic images or video captured at the remote location, or images rendered by computer graphics, and may also further include remotely accessible live images such as those captured by a webcam.

Figure 2:
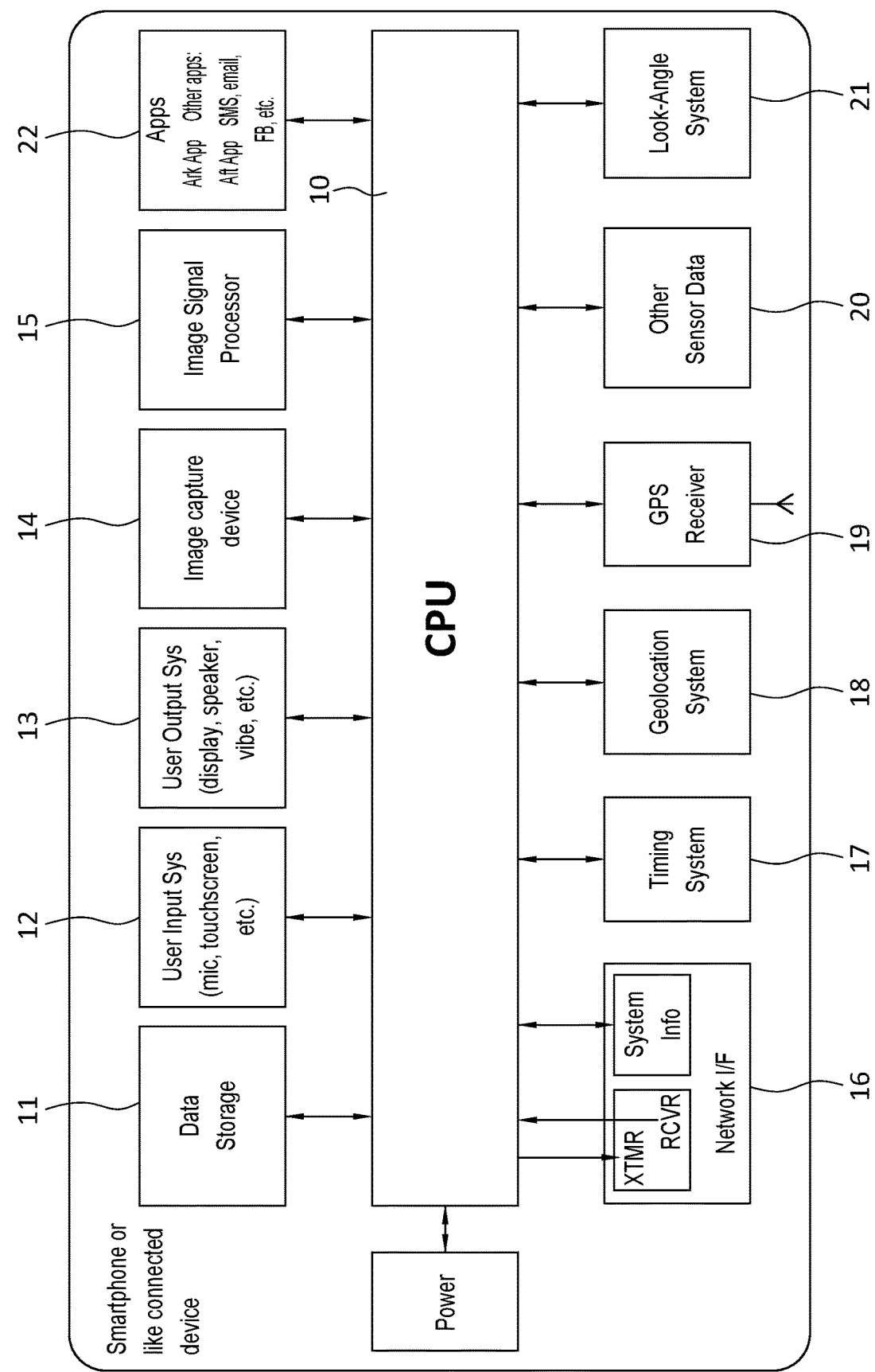
FIG. 2 is a block diagram showing components of a mobile device modified by the inclusion of a ArK viewing and creating/managing app utilized by the method and system of the preferred embodiment.

FIG. 2 shows required components of the mobile device 7, including a hardware central processing unit (CPU) 10 and data storage 11, and various units that may include or be implemented as hardware, programmed firmware, or software instructions for execution by the CPU 10. The units include a user input interface 12, which may include a microphone, a touchscreen, a keypad, an orientation or motion sensor, or any other input device or combination of input devices, and an output interface 13, which may include a display screen (such as the touchscreen), a speaker, and/or a vibration generating device. The mobile device also includes an image capture device 14, such as a camera or CCD sensor, an image signal processor 15, which may be a separate integrated circuit or included in the CPU, a network interface 16, including a transceiver, SIM card, and/or any other device or circuit that allows wireless communications, a timing system or clock 17, which may be included in the CPU, a geolocation system 18, which may include circuitry for processing location signals from the cellular network or received by a GPS, GNSS, or GLONASS transceiver 19 as well as additional sensors 20 such as motion, acceleration, and/or sensors, and magnetometer or other sensors or devices 21 for determining an orientation or direction of the mobile device 4. Finally, the mobile device includes mobile apps 22, and in particular an ArK app for implementing the method and system of the invention, as described below.

It will be appreciated by those skilled in the art that software for overlaying AR images on captured images based on geolocation is known, and can be utilized by the present invention. For example, U.S. Pat. Nos. 9,773,285, 9,536,251, and 8,929,591 all disclose AR systems that overlay AR objects on captured images based, as least in part, on geolocation. The Pokemon Go™ augmented reality game is another example of mobile app software that overlays location-linked virtual reality objects on captured images.

Figure 3:
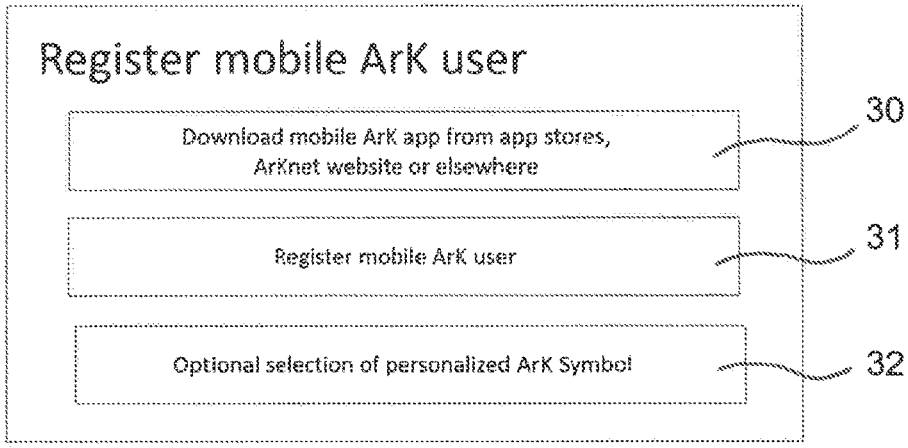

In particular, as shown in FIG. 3, the mobile device app of the present invention also provides an ArK creation, deployment, and/or management interface for establishing, deploying and managing the AR objects or ArKs represented schematically in FIG. 1B by circles A to G.

According to step 30 of the method illustrated in FIG. 3, a user downloads the mobile app to a mobile device of the type illustrated in FIG. 2, and registers the app (step 31). As part of the registration procedure, the app can capture the unique mobile device identification, which can be used to identify the owner of an ArK. In addition, the app may require identity confirmation by in-person registration or any existing Know Your Customer (KYC) methods, although it is also possible to provide for anonymous registration.

In step 32, the user selects at least one personal ArK symbol or ArK avatar, which can be a generic ArK symbol, a symbol that is selected from a list or library containing available ArK symbols, images, or GIFs, a symbol that is created by the user using an image or symbol using drawing software, or a symbol that is created by selecting and modifying an existing image possessed or downloaded by the user.

Figure 4:
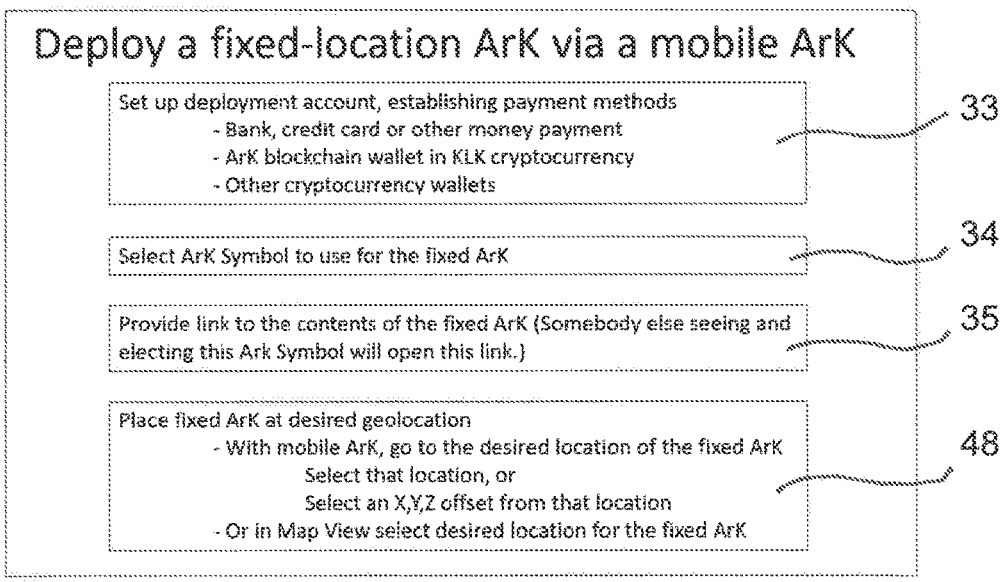

FIG. 4 shows an illustrative procedure for deploying a geo-located ArK of the type that may be inserted into scenes from a defined geographic area or community according to the principles of the present invention, i.e., for setting up the locations at which the app user's ArK will be visible to the other users, the types of interaction with the ArK that are permitted, and the set of person who are capable of viewing the ArK and/or interacting in defined ways with the ArK. Step 33 refers to an optional step of setting up a deployment account, which will enable the user setting up the ArK, referred to herein as "owner," to receive compensation or payments from persons viewing and interacting with the ArK, or from another entity based on the interactions and/or ArK views, and also to make payments to the provider of the app and to others. The account could be a bank account, credit card account, payment service such as Square or Paypal, an Ark Blockchain Wallet of the type described in copending U.S. patent application Ser. No. 16/674,559, or another cryptocurrency wallet.

In step 34, the app user selects a symbol for the fixed ArK, either from a list or template, or of the user's design and, in step 35, the user establishes a link to the contents of the ArK. Finally, in step 48, the user establishes a geo-location for the ArK, either by going to the desired location and using the ArK app to set the ArK's position, or by using a Map View to locate the ArK. If the user selects the option of utilizing the mobile device's location determining capabilities to record the location as which the ArK is to be positioned, the location can be established by determining the exact position of the mobile device and, optionally, adding an offset so that the ArK can be positioned above or below the user's position, or near the user's position in but in at a location that the user is not able to actually enter (for example, the ArK could be located so that it floats above the viewer or appears in an inaccessible location such as a shark tank at an aquarium).

The content of the fixed ArK, i.e., the data and programming accessed when a viewer selects the ArK, may be information, video, audio, another mobile app, or a website through which the viewer can carry out transactions such as making a purchase. The purchase can be carried out through the blockchain wallet by debiting the viewer's wallet and crediting the owner of the ArK. Alternatively, the owner of the ArK may receive compensation each time a viewer selects the ArK, with the compensation being credited to the user's account, either in conventional or crypto currency, such as the crypto currency described below.

As part of the ArK creation procedure, the mobile app can also use blockchain technology to create a blockchain record of the ArK's creation and ownership, allowing anyone who subsequently interacts with the ArK to verify its ownership and any transactions that involve the ArK, in a manner similar to the manner in which cryptocurrency transactions are verified by updating a blockchain whenever a transaction involving the cryptocurrency occurs. Use of blockchains provides additional safety for anyone who wishes to take part in the ArK ecosystem.

Figure 5:
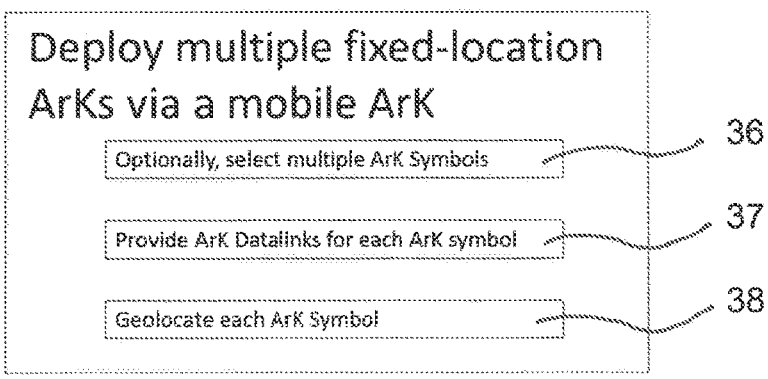

The user may also be provided with the option of deploying multiple fixed location ArKs (in a single community or in multiple communities), as illustrated in FIG. 5, which includes optional step 36 of selecting multiple ArK symbols, step 37 of providing content links for the multiple symbols or a single symbol, and step 38 of geolocating the ArKs in the manner described above. It is not necessary to provide a different Ark at each geolocation, so step 36 and/or step 37 may be omitted and the same ArK may be located at different locations. Alternatively, the app user may choose to use different symbols at different locations for the same content, or to use the same symbol at different locations to link to different location-appropriate content.

In step 39, the app user is given the option of selecting visibility options that enable the app user to choose whether all or just some of potential viewers are able to see the ArKs when using the app on their mobile device, and also the identities or group-affiliations of those able to view the ArKs or interact with the Arks in a predetermined way. In step 40, the app user can also select multiple symbols for individual ArKs, so that different groups see different augmented reality images when viewing the same ArK, or so that the augmented reality images change over time, for example seasonally or on special occasions or holidays.

It will be appreciated that there is no limit as to either the form or the content of the geo-located ArKs created and viewed by the method and system described above. For example, a number of different examples are included in the above-cited copending U.S. patent application Ser. No. 16/674,559. In any of those examples, a user's interaction with an ArK visible on the screen of the user's mobile device (or otherwise visible to the user through imaging cyborg technology) can be, in the case of a mobile ArK, via peer to peer software with the mobile device of the ArK's owner, peer to peer communications via a server, or other communications means such as SMS, email, web browser communications, and FTP services, as indicated by block 41 in FIG. 7. In the case of a fixed ArK, as indicated by block 42, interaction with ArK can be through direct interaction with a device at the location of the ArK, or through a browser or webpage, such as an e-commerce webpage, or via file download and upload.

Finally, as illustrated in FIG. 8, the AR Symbols for existent ArKs in an observer's near environment may be viewed either as overlaid on actual views of the "community" or, as indicated by blocks 43 and 44, or in a map view, indicated by blocks 45 and 46, properly located on the map (referred to as a "Neary map"). In the map view of blocks 45 and 46, a Neary map may be scaled up to show ArKs beyond the near environment, allowing the ArK user to browse ArKs available to be seen by that user, whether locally or across the entire globe if desired. In such a map view, a user could be permitted to filter ArKs by content, so that the user could for example search for a specific type of restaurant, and open ArKs that meet the criteria in order to view menus, video of the venue, and make reservations or purchases.

What is claimed is:

1. A method of deploying, managing, and interacting with augmented reality objects, comprising the steps of:
    distributing augmented reality object creation and deployment software to content sponsors in a geographic area identifiable by at least one name and/or identifier, the software enabling the sponsors to create and deploy the augmented reality objects and link the augmented reality objects to specified locations in the geographic area,
    distributing viewer software to viewers outside the geographic area, the viewer software being configured to:
        (a) enable the viewers to select the geographic area by inputting the at least one name or identifier into the viewer software,
        (b) control devices of the viewers to display navigable views of the geographic area and enable the viewers to change the views by inputting navigation commands or instructions in order to explore the geographic area,
        (c) display at least one of the augmented reality objects when one of the views includes an image of one of the specified locations, and
        (d) enable the viewer to select and interact with the at least one of the augmented reality objects.

2. A method as claimed in claim 1, wherein the viewer software is a mobile device app that includes instructions to be executed by a central processing unit of the mobile device.

3. A method as claimed in claim 1, wherein the augmented reality object creation and deployment software is a mobile device app that includes instructions to be executed by a central processing unit of the mobile device.

4. A method as claimed in claim 1, wherein the augmented reality objects link to interactive content provided by the sponsors.

5. A method as claimed in claim 4, wherein the interactive content selectively includes at least one of information, images, video, forms, and links to programs, applets, or webpages.

6. A method as claimed in claim 1, wherein the augmented reality object creation and deployment software and the viewer software are included in a single app, allowing anyone with a device on which the app is stored and executed to create and deploy augmented reality objects in a first geographic area in which the device's user is located and to interact with augmented reality objects in geographic areas other than the first geographic area.

7. A method as claimed in claim 1, wherein the augmented reality object is created, located, and deployed by performing the following steps:
    the sponsor selecting a symbol for the augmented reality object from a list or library of symbols, or by the sponsor creating the symbol;
    the sponsor linking content to the augmented reality object, said content selectively including information, images, video, forms, and links to programs, applets, webpages, or other interactive content; and
    the sponsor selecting a location or address for the augmented reality object.

8. A system deploying, managing, and interacting with augmented reality objects, comprising:
    a plurality of devices arranged to store and execute augmented reality object creation and deployment software configured to enable content sponsors in a geographic area identifiable by at least one name and/or identifier to create and deploy the augmented reality objects and link the augmented reality objects to specified locations in the geographic area,
    a plurality of devices arranged to store and execute viewer software configured to:
        (e) enable viewers situated outside the geographic area to select the geographic area by inputting the at least one name or identifier into the viewer software,
        (f) control devices of the viewers to display navigable views of the geographic area and enable the viewers to change the views by inputting navigation commands or instructions in order to explore the geographic area,
        (g) display at least one of the augmented reality objects when one of the views includes an image of one of the specified locations, and
        (h) enable the viewer to select and interact with the at least one of the augmented reality objects.

9. A system as claimed in claim 8, wherein the viewer software is a mobile device app that includes instructions to be executed by a central processing unit of the mobile device.

10. A system as claimed in claim 8, wherein the augmented reality object creation and deployment software is a mobile device app that includes instructions to be executed by a central processing unit of the mobile device.

11. A system as claimed in claim 8, wherein the augmented reality objects link to interactive content provided by the sponsors.

12. A system as claimed in claim 11, wherein the interactive content selectively includes at least one of information, images, video, forms, and links to programs, applets, or webpages.

13. A method as claimed in claim 8, wherein the augmented reality object creation and deployment software and the viewer software are included in a single app, allowing anyone with a device on which the app is stored and executed to create and deploy augmented reality objects in a first geographic area in which the device's user is located and to interact with augmented reality objects in geographic areas other than the first geographic area.

14. A system as claimed in claim 8, wherein the augmented reality object is created, located, and deployed by performing the following steps:
    the sponsor selecting a symbol for the augmented reality object from a list or library of symbols, or by the sponsor creating the symbol;
    the sponsor linking content to the augmented reality object, said content selectively including information, images, video, forms, and links to programs, applets, webpages, or other interactive content; and
    the sponsor selecting a location or address for the augmented reality object.

* * * * *